Patented Nov. 29, 1938

2,138,434

UNITED STATES PATENT OFFICE 2,138,434

FERMENTATION PROCESS AND PRODUCT

Charles A. Thomas and Carroll A. Hochwalt, Dayton, Ohio, assignors, by mesne assignments, to Monsanto Chemical Company, St. Louis, Mo., a corporation of Delaware No Drawing. Application October 22, 1935, Serial No. 46,159

3 Claims. (Cl. 99—96)

This invention relates to the fermentation art and to the production of fermentation products.

It is the principal object of this invention to provide a modified yeast or vegetable derived product having its normal yeast active or other characteristics and which is free from objectionable taste and odor characteristics otherwise present.

It is a further object to provide a simple and effective method for treating a ferment or a fermentation product to remove or render unobjectionable the characteristic odor or taste thereof.

Another object is to provide a simple and effective process for producing a product of this character.

Fermentation processes are used extensively in the production of food and beverage products and the like, for instance in the production of yeast, cheese, beer, wine, whiskey, brandy, and the like. Such products are characterized by distinctive odor and taste which in many cases is unpleasant and objectionable. For instance, in the edible food products produced by fermentation, such as in the making of yeast, as produced generally in the form of cakes of compressed yeast, this product, while valuable as a food product in many cases, has a characteristic odor and a taste which make it unattractive and even nauseating to many persons. Similarly, in the production of whiskey, the freshly distilled whiskey has pronounced characteristics, generally called "greenness", which make it unpalatable and which have required extensive aging or similar processes for the removal of these objectionable characteristics.

In accordance with the present invention, it has been discovered that the presence of these objectionable characteristics is the result, in large measure, of the fermentation process itself, and the materials which produce these undesirable tastes and odors, while not definitely understood as to their chemical nature, are believed to be the result of residual products arising from the original fermentation organism.

The invention provides a very simple process for removing or rendering ineffective those materials that are present and produce the objectionable odor and taste. Thus a ferment itself, such as yeast, has been successfully produced which is devoid of the customary unpleasant taste and odor and which is practically tasteless and odorless. Similarly with beverages of the character described, the materials which are responsible for producing the undesirable taste and odor have heretofore been very difficult to remove, and it has been found that they are not removed by a distillation process. Hence when a whiskey mash for instance was subjected to distillation, these products were passed over and present in the distilled product, and it is believed that it is these products resulting from the original fermentation that are responsible for producing undesired "green" characteristics in freshly distilled whiskey.

In the previous applications of the inventors herein, applications Serial No. 703,154, filed December 19, 1933, and Serial No. 743,752, filed September 12, 1934, now Patent Nos. 2,027,100 and 2,027,129 respectively, dated Jan. 7, 1936, there are described processes particularly adapted to the improvement of whiskey, as obtained as a result of distillation. The present invention, however, relates to the improvement in characteristics of fermentation products used for food, beverage products prior to distillation, and even of the ferment itself.

In accordance with the present invention it has been found that the flavor and odor of products of this nature can be greatly improved by subjecting the product, following the fermentation, to a controlled processing adapted to bring about reducing conditions in the product, and that such processing when properly controlled will remove objectionable qualities from the ferment itself where such ferment is the food product, or from the fermented liquor where such liquor is the product desired to be used.

The invention will first be described in conjunction with the formation of a yeast product of the character described. The propagated yeast may be produced in the customary manner as by allowing the yeast to propagate in the presence of water and its proper food, the yeast rising to the surface where it may be collected, filtered, and prepared for the final compressing into cakes. Prior to such final step, however, the yeast mass is suspended in a suitable quantity of water is subjected to a reducing process. Thus a suspension of the yeast is subjected to the action of hydrogen gas which is bubbled through the yeast while in suspension and in the presence of a suitable catalyst also suspended in the liquid. Agitation is continuously effected to maintain the yeast and the catalyst in the proper suspension and to assure the proper and intimate contact with the hydrogen gas. A gentle stream of hydrogen can be passed through the suspension which may be artificially agitated by mechanical means if desired. The result is to modify the propagated yeast mass probably through what may be called a hydrogenation action effective upon constituents included therein which normally have objectionable characteristics of odor and taste, without appreciably or objectionably diminishing the normal yeast active characteristics of the propagated yeast mass; or where the action is upon a modified vegetable derived product, as hereafter described, without appreciably or objectionably affecting the desirable other products and characteristics normally present.

The catalyst employed is preferably a finely divided metal which is also kept in suspension by the agitation. The catalyst most effective for this purpose is finely divided platinum, known as platinum black. Similarly a suspension of finely divided metallic nickel or finely precipitated cobalt may be prepared. The quantity of such catalyst or other suitable catalyst, may be varied over rather wide limits depending upon the particular characteristics of the individual catalyst. It is ordinarily required to be used, however, in only a small amount in proportion to the quantity of liquid being treated. A catalyst may be used in amounts from mere traces to as much as 5% of the weight of the material being treated, usually, however, one part of the catalyst to a thousand parts of material being satisfactory. The activity of such catalyst decreases, but it can be recovered repeatedly and reactivated indefinitely. Similarly the length of time the reaction is allowed to proceed will vary in different cases. But it can be determined in accordance with the effect produced upon the product, and can be terminated as soon as the product reaches the desired condition of freedom from objectionable characteristics. Ordinarily the reaction will continue for periods up to several hours, varying with the individual materials, and with the degree of activity of the catalyst, until the desired improvement in the product is obtained.

Thereafter the yeast may be collected from suspension, separated from the catalyst, in any convenient manner as by settling, centrifuging, filtration, or the like, and formed into cakes of compressed yeast or any other desired form, in the manner conventional in the art. And such product will be found to be substantially free of odor and taste, such as to be a quite unobjectionable and palatable food product.

A similar process may be performed in the case of cheese and other edible products, for the production of cheeses and the like having new, distinctive, and more pleasant taste, the processing according to the present invention being carried out at a suitable stage in the manufacture subsequent to the fermentation. Similarly with regard to beverage products, such products following the fermentation reaction contain small quantities of these undesirable constituents which at this stage of the manufacture can be effectively treated so that they are either removed or their presence rendered unobjectionable during the subsequent processing and use of the beverage. Thus it has been found that where a mash has been processed in accordance with this invention, even the subsequent distillation step performed, for example, as in the manufacture of whiskey or brandy, does not affect the characteristics of the liquor, and that following such distillation process it remains substantially free of these ingredients having undesirable taste and odor.

In the processing of such a liquid beverage product, the mash following fermentation is subjected to the hydrogenation step as described above, in the presence of a catalyst, the catalyst being suspended in the liquid and the hydrogen gas being bubbled therethrough as described. Thus the liquor is so changed at this stage of its processing as to be very materially improved in its characteristics, and this improvement remains substantially permanently notwithstanding a further processing of the liquor.

The invention provides therefore a very simple and effective process for the treating of fermentation products, and even of the ferment itself, providing for the removal of objectionable taste and odor therefrom to provide new fermentation end products, having new and very desirable characteristics particularly adapting them for use as food and beverage products. Similar improvement in the characteristics of other fermentation processes and products may be brought about in the same manner, in the production of fermentation products for commercial or other purposes, providing for the obtaining of such products in a state of great purity and freedom from small quantities of constituents otherwise difficult to separate.

While the process and product herein described constitute preferred embodiments of the invention, it is to be understood that the invention is not limited to this precise process and product, and that changes may be made therein without departing from the scope of the invention which is defined in the appended claims.

What is claimed is:

1. The method of producing an edible yeast product having normal viable characteristics and having improved palatability which comprises subjecting the active yeast in aqueous suspension and containing the residual products arising from the fermentation organism to a hydrogenation treatment with simultaneous agitation and under conditions of temperature and pressure insufficient to destroy the activity of the yeast and in the presence of a catalyst from the group consisting of finely divided platinum, nickel and cobalt, and thereafter removing the catalyst from the suspension to produce said yeast product having its normal viable characteristics and in a substantially odorless and tasteless condition.

2. The method of producing an edible yeast product having normal viable characteristics and having improved palatability which comprises subjecting the active yeast in aqueous suspension and containing the residual products arising from the fermentation organism to a hydrogenation treatment with simultaneous agitation and under conditions of temperature and pressure insufficient to destroy the activity of the yeast and in the presence of a catalyst adapted to promote a hydrogenation reaction, and thereafter removing the catalyst from the suspension to produce said yeast product having its normal viable characteristics and in a substantially odorless and tasteless condition.

3. A viable yeast product having improved palatability and being substantially free of objectionable odor and taste, essentially consisting of yeast cells having substantially normal yeast activity as regards viability and containing the residual products arising from the yeast organism and normally having objectionable characteristics as to odor and taste, such residual products being in a hydrogenated condition and substantially free of objectionable odor and taste.

CHARLES A. THOMAS.
CARROLL A. HOCHWALT.